000
(12) United States Patent
Nishiyama et al.

(10) Patent No.: US 9,946,326 B2
(45) Date of Patent: Apr. 17, 2018

(54) USER INTERFACE DEVICE AND ELECTRONIC DEVICE INCLUDING THE SAME

(71) Applicant: Rohm Co., Ltd., Kyoto (JP)

(72) Inventors: Hideki Nishiyama, Kyoto (JP); Hiroaki Sano, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 36 days.

(21) Appl. No.: 14/792,724

(22) Filed: Jul. 7, 2015

(65) Prior Publication Data

US 2016/0011644 A1    Jan. 14, 2016

(30) Foreign Application Priority Data

Jul. 9, 2014   (JP) .................. 2014-141383

(51) Int. Cl.
| G06F 3/041 | (2006.01) |
| G06F 3/045 | (2006.01) |
| G06F 1/32 | (2006.01) |
| G06F 3/00 | (2006.01) |
| G06F 3/044 | (2006.01) |
| G06F 3/01 | (2006.01) |
| G06F 1/16 | (2006.01) |

(52) U.S. Cl.
CPC .......... *G06F 1/3231* (2013.01); *G06F 1/1632* (2013.01); *G06F 1/3287* (2013.01); *G06F 3/002* (2013.01); *G06F 3/017* (2013.01); *G06F 3/044* (2013.01); *Y02B 60/1282* (2013.01); *Y02B 60/1289* (2013.01); *Y02B 60/32* (2013.01)

(58) Field of Classification Search
CPC .... G06F 1/1632; G06F 1/3231; G06F 1/3287; G06F 3/044; G06F 3/017; G06F 3/002
See application file for complete search history.

(56) References Cited

U.S. PATENT DOCUMENTS

| 2011/0080367 | A1* | 4/2011 | Marchand | G06F 1/3215 345/174 |
| 2011/0265568 | A1* | 11/2011 | Stephanou | G01C 19/5712 73/514.32 |
| 2012/0162120 | A1* | 6/2012 | Miller | G06F 3/0488 345/173 |
| 2012/0185203 | A1* | 7/2012 | Tanaka | G06F 3/0487 702/141 |
| 2014/0022528 | A1* | 1/2014 | Lee | G01S 17/026 356/4.01 |
| 2014/0036131 | A1* | 2/2014 | Wang | H04N 5/23216 348/333.11 |

(Continued)

FOREIGN PATENT DOCUMENTS

JP    2011-227574    11/2011

*Primary Examiner* — Kwang-Su Yang
(74) *Attorney, Agent, or Firm* — Fish & Richardson P.C.

(57) ABSTRACT

A user interface device includes: a proximity sensor configured to detect proximity of a user; an electrostatic switch configured to detect capacitance changes of a plurality of electrodes; an acceleration sensor configured to detect an acceleration; and a microcomputer configured to control supply of electric current to the electrostatic switch and the acceleration sensor based on a detection result of the proximity sensor, and recognize a plurality of user operations based on detection results of the electrostatic switch and the acceleration sensor.

10 Claims, 8 Drawing Sheets

(56) References Cited

U.S. PATENT DOCUMENTS

2015/0106368 A1* 4/2015 Sohn .................. G06Q 10/10
707/732
2015/0346979 A1* 12/2015 Amemiya ............ G06F 1/1626
715/835

* cited by examiner

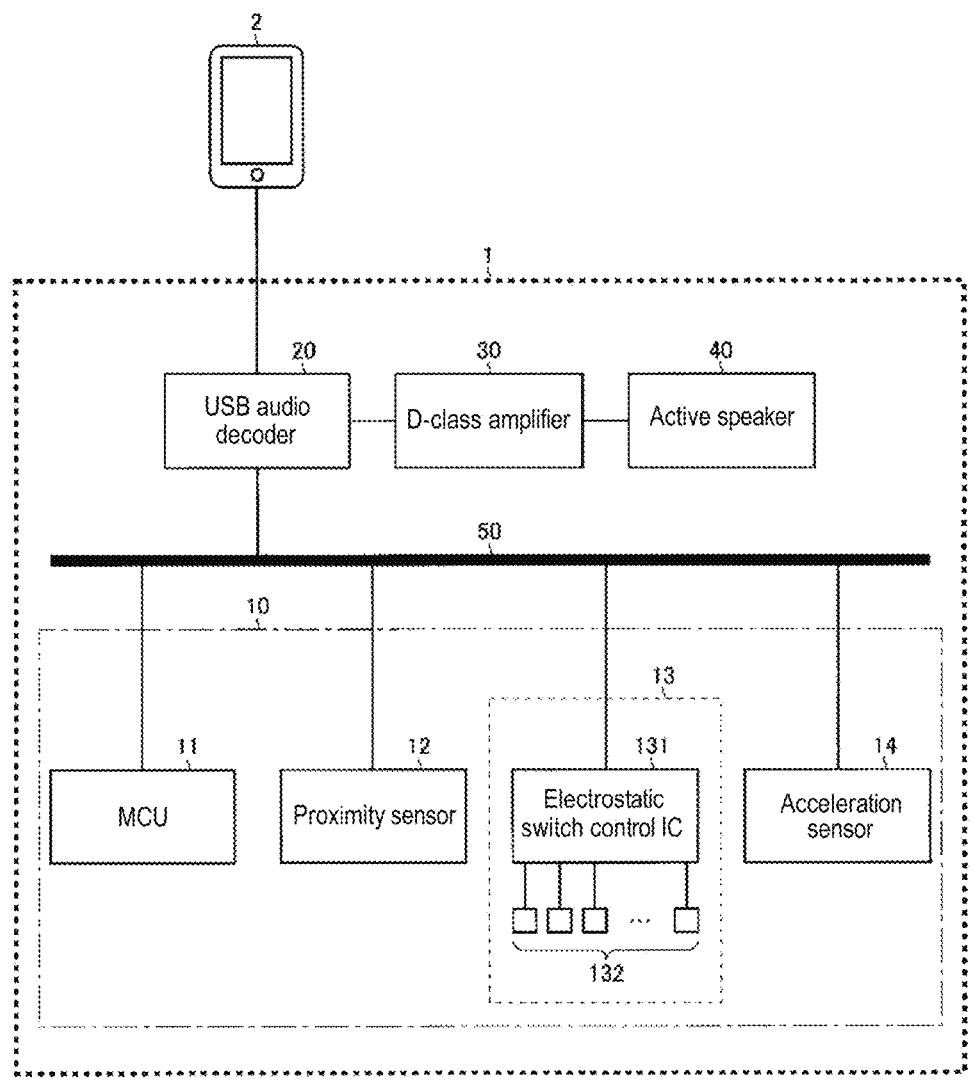

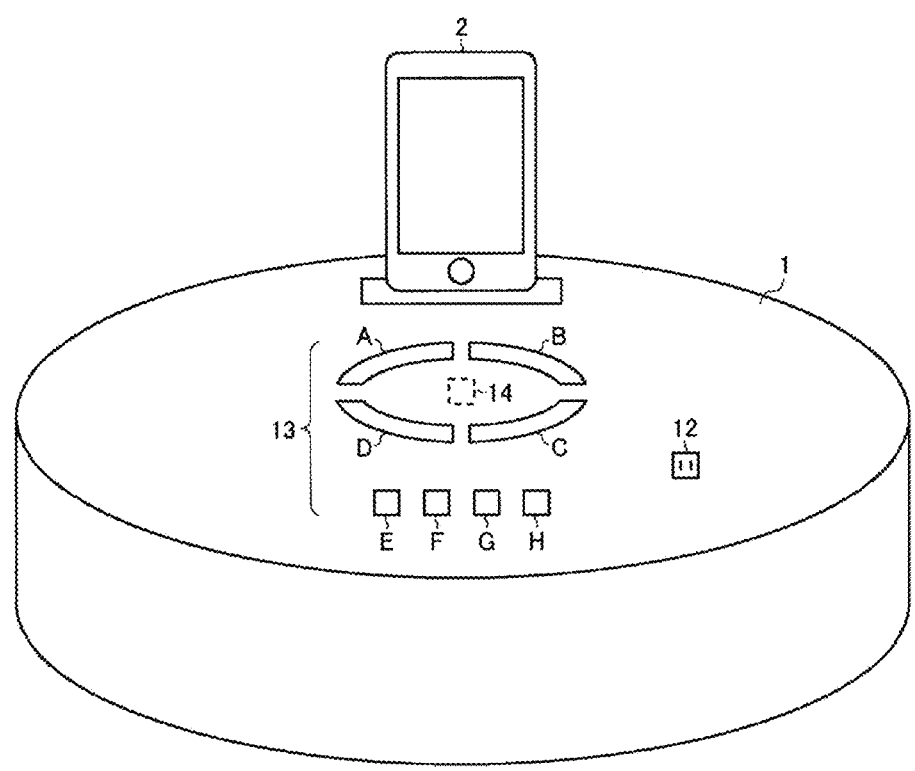

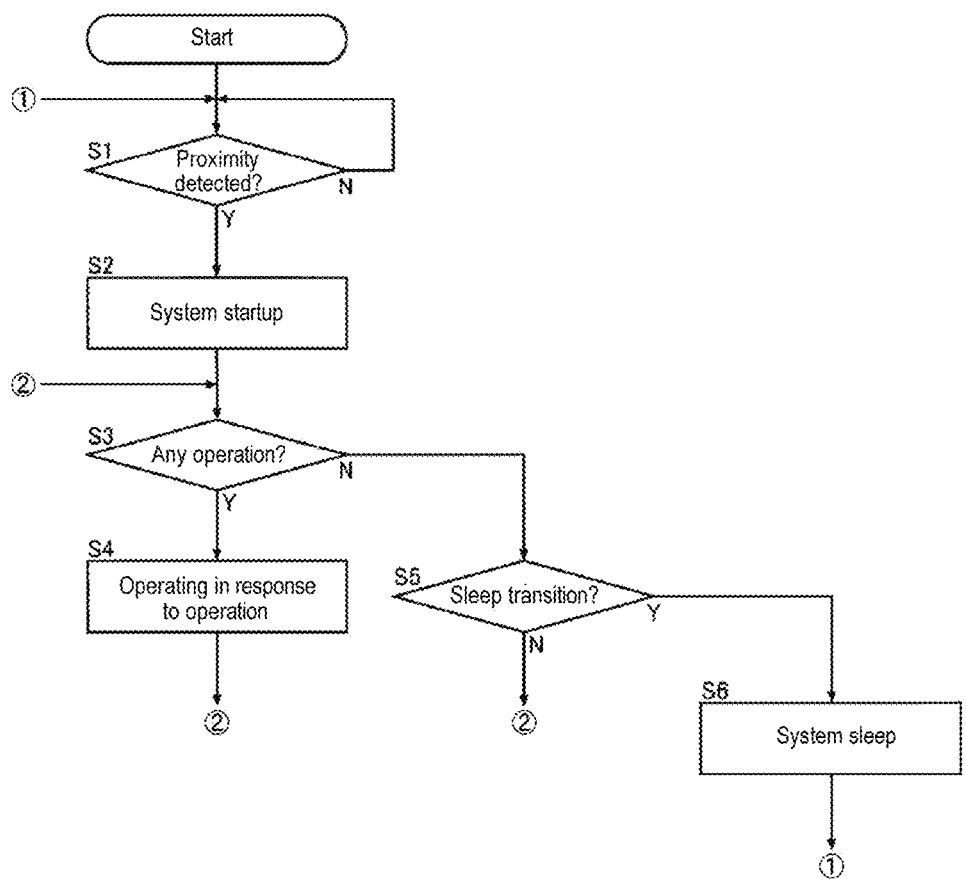

USER INTERFACE DEVICE AND ELECTRONIC DEVICE INCLUDING THE SAME

CROSS-REFERENCE TO RELATED APPLICATION

This application is based upon and claims the benefit of priority from Japanese Patent Application No. 2014-141383, filed on Jul. 9, 2014, the entire contents of which are incorporated herein by reference.

TECHNICAL FIELD

The present disclosure relates to a user interface device.

BACKGROUND

User interface devices are generally configured to accept user operations via a mechanical switch or a touch panel.

When a mechanical switch is used, irregularities are generated on the surface of a device, which may impair the design of the device. In addition, operations based on user's gestures may not be performed by using mechanical switches.

On the other hand, when a touch panel is used, operations may be performed based on a user's gestures. However, touch panels are relatively expensive, which may pose a cost problem. Since touch panels are always in a sensing state, the current consumption increases.

SUMMARY

The present disclosure provides some embodiments of a user interface device that are inexpensive and power-saving, and are capable of receiving various user operations.

A user interface device disclosed herein is directed to a configuration (a first configuration), including: a proximity sensor configured to detect proximity of a user; an electrostatic switch configured to detect capacitance changes of a plurality of electrodes; an acceleration sensor configured to detect an acceleration; and a microcomputer configured to control supply of electric current to the electrostatic switch and the acceleration sensor based on a detection result of the proximity sensor, and recognize a plurality of user operations based on detection results of the electrostatic switch and the acceleration sensor.

The device of the first configuration may be directed to a configuration (a second configuration) wherein the proximity sensor is configured to detect the proximity of the user based on whether infrared light outputted from a light emitting unit is reflected by an object and returned to a light receiving unit.

The device of the first or second configuration may be directed to a configuration (a third configuration) wherein the proximity sensor is configured to detect the proximity of the user based on whether a sharp change in light receiving intensity of a light receiving unit is generated.

The device of any one of the first to third configurations may be directed to a configuration (a fourth configuration) wherein the microcomputer is configured to recognize a gesture operation and a tapping operation based on the detection result of the electrostatic switch.

The device of the fourth configuration may be directed to a configuration (a fifth configuration) wherein the electrodes are arranged in a layout corresponding to the gesture operation to be recognized by the microcomputer.

The device of any one of the first to fifth configurations may be directed to a configuration (a sixth configuration) wherein the microcomputer is configured to recognize a tapping operation based on the detection result of the acceleration sensor.

An electronic device disclosed herein is directed to a configuration (a seventh configuration) comprising the user interface device of any one of the first to sixth configurations.

The electronic device of the seventh configuration may be directed to a configuration (an eighth configuration) wherein the microcomputer is configured to stop power supply to respective parts of a system when a predetermined sleep transition condition is satisfied, and to resume the power supply to the respective parts of the system when the proximity of the user is detected.

The electronic device of the eighth configuration may be directed to a configuration (a ninth configuration) wherein the microcomputer is configured to determine that the sleep transition condition is satisfied, when proximity of the user is not detected, a user operation is not detected by the electrostatic switch and the acceleration sensor, and the respective parts of the system are not operated in response to the user operation, over a predetermined sleep transition time.

The electronic device of any one of the seventh to ninth configurations may be directed to a configuration (a tenth configuration) further including: a connection member configured to interconnect a housing of the electronic device and a substrate on which the acceleration sensor is mounted.

BRIEF DESCRIPTION OF THE DRAWINGS

FIG. 1 illustrates a dock speaker including a user interface device, according to one embodiment of the present disclosure.

FIG. 2 illustrates an external view of a dock speaker, according to one embodiment of the present disclosure.

FIG. 3 illustrates a flowchart of an exemplary method performed by the dock speaker, according to one embodiment of the present disclosure.

DETAILED DESCRIPTION

Application to Dock Speaker

Figure 4A:
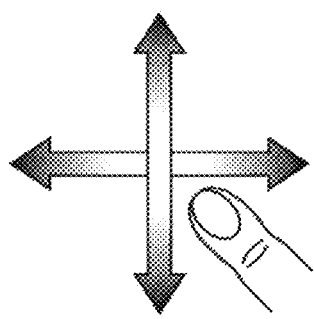
FIGS. 4A to 4D illustrate exemplary user operations performed using an electrostatic switch, according to embodiments of the present disclosure.

FIG. 1 illustrates a block diagram of a dock speaker 1 including a user interface device 10. FIG. 2 illustrates an external view of the dock speaker 1.

As illustrated, the dock speaker 1 is an electronic device for playing back music data of a portable audio device 2 externally connected thereto. The dock speaker 1 includes a user interface device 10, a USB audio decoder 20, a D-class amplifier 30, an active speaker 40, and an I²C (inter-integrated circuit) bus 50.

The user interface device 10 is a front end for receiving various user operations (volume-up/down operations, playback track feed/return operations, music playback start/pause/stop operations, etc.). The user interface device 10 includes a microcomputer 11, a proximity sensor 12, an electrostatic switch 13, and an acceleration sensor 14.

The microcomputer 11 is an entity that generally controls the overall system of the dock speaker 1. For example, a low-power MCU (micro control unit) may be used as the microcomputer 11. In particular, when the microcomputer 11 controls the user interface device 10, the microcomputer 11 may control supply of electric current to the electrostatic switch 13 and the acceleration sensor 14 based on the detection result of the proximity sensor 12, and recognize various user operations based on the detection results of the electrostatic switch 13 and the acceleration sensor 14, which will be described in detail below.

The proximity sensor (human sensor) 12 is a sensing means for detecting the proximity of a user who wishes to operate the dock speaker 1. As the proximity sensor 12, it may be possible to use a reflective infrared sensor that detects the proximity of a user depending on whether infrared light outputted from a light emitting unit is reflected by an object (human body) and returned to a light receiving unit. Alternatively, it may be possible to use an illuminance sensor that detects the proximity of a user depending on whether a sharp change in the light receiving intensity of a light receiving unit is generated by a shadow of a person. When a user operates the dock speaker 1, the user may stretch his or her hand toward the electrostatic switch 13. It is therefore preferable in some embodiments to dispose the proximity sensor 12 in the vicinity of the electrostatic switch 13. In FIG. 2, since most of the users are right-handed, the proximity sensor 12 is arranged at the right side of the electrostatic switch 13 when the housing of the dock speaker 1 is seen from the front side. However, the arrangement position of the proximity sensor 12 is not limited thereto. The proximity sensor 12 may be installed at other locations (e.g., on the side surface of the housing of the dock speaker 1). In addition, the number of the proximity sensor 12 is not limited to one. If a priority is given to the improvement of detection accuracy of the user proximity, a plurality of proximity sensors 12 may be installed within an acceptable range of power consumption.

The electrostatic switch 13 is a sensing means that detects a gesture operation or a tapping operation of a user. The electrostatic switch 13 includes an electrostatic switch control IC 131 and a plurality of electrodes 132 (e.g., electrodes A to H).

The electrostatic switch control IC 131 is a semiconductor device that detects capacitance changes of the electrodes 132 arranged side by side. The electrostatic switch control IC 131 is provided therein with, for example, an AFE (analog front end) that detects a capacitance, an A/D converter that converts an analog detection value of a capacitance to a digital detection value, an MPU (micro processing unit) that processes the digital detection unit, a 2-wire serial bus host interface corresponding to an I²C bus protocol, a power-on reset, a clock oscillation circuit and an internal-use LDO (low drop-out) regulator.

The electrodes 132 are arranged side by side on a top plate of the housing of the dock speaker 1 in a layout corresponding to gesture operations to be recognized by the microcomputer 11. Descriptions will be made in detail with reference to FIG. 2. Electrodes A to D are annularly disposed in the central portion of the top plate of the housing so that the electrodes A to D may detect clockwise/counter clockwise wheel operations. Furthermore, electrodes E to H are disposed in the front end portion of the top plate of the housing along a straight line extending in a left-right direction so that the electrodes E to H can detect a slide operation performed in a transverse direction (left-right direction). However, the electrode layout is not limited thereto. For example, the electrodes may be disposed along a straight line extending in a front-back direction of the top plate or may be disposed in an arc-shape along an outer edge of the top plate. Moreover, the number of the electrodes 132 is not limited to eight and may be appropriately increased or decreased depending on the types of gesture operations or the processing ability of the electrostatic switch control IC 131.

The acceleration sensor 14 is a sensing means that detects an acceleration applied thereto. A MEMS (micro electro mechanical systems) acceleration sensor or the like may be used as the acceleration sensor 14. When detecting only a tapping operation with respect to the top plate of the housing (see arrow Z in FIG. 5), the detection axis number of the acceleration sensor 14 may be one axis. On the other hand, when detecting not only the tapping operation with respect to the top plate of the housing but also tapping operations with respect to the side plate of the housing (see arrows L, R, F and B in FIG. 5), the acceleration sensor 14 may have two axes or three axes. The acceleration sensor 14 may be installed in the central portion of the top plate of the housing so that the acceleration sensor 14 may accurately detect tapping operations performed in any direction.

The USB (universal serial bus) audio decoder 20 is operated in response to an instruction transmitted from the microcomputer 11 and is configured to decode music data of the portable audio device 2 externally connected to a USB port.

The D-class amplifier 30 amplifies a decoded music signal inputted from the USB audio decoder 20.

The active speaker 40 performs audio output in response to an amplified music signal inputted from the D-class amplifier 30.

The I²C bus 50 is connected to the microcomputer 11, the proximity sensor 12, the electrostatic switch 13, the acceleration sensor 14, and the USB audio decoder 20 and is used as a serial communication path between the respective components.

FIG. 3 illustrates a flowchart of an exemplary method performed by the dock speaker 1 (mainly, the microcomputer 11), according to one embodiment of the present disclosure. It is assumed that the overall system of the dock speaker 1 (excluding the microcomputer 11 and the proximity sensor 12 which are required for a wakeup operation) is initially in a sleep state.

At step S1, the proximity sensor 12 determines whether a user is proximate to the dock speaker 1. If it is determined that the user is proximate to the dock speaker 1 at step S1, the method proceeds to step S2. On the other hand, if it is determined that the user is not proximate to the dock speaker 1 at step S1, the method proceeds back to step S1. User proximity detection is repeated periodically (e.g., every one second) until it is determined that the user is proximate to the dock speaker 1 at step S1.

For periodically detecting user proximity, for example, a method including the steps of periodically polling the proximity sensor 12, and notifying the detection of the user proximity to the microcomputer 11 may be employed. Alternatively, the method includes the steps of periodically requesting, by the microcomputer 11, to the proximity sensor 12, and performing user proximity detection, by the proximity sensor 12, each time the proximity sensor 12 receives the request from the microcomputer 11.

In the case where it is determined that the user is proximate to the dock speaker 1 at step S1, power supply to the respective parts of the system is resumed in response to an instruction from the microcomputer 11, and the overall system is started up (waken up) at step S2. That is, after step S2, the electrostatic switch 13 and the acceleration sensor 14 come into a state in which they can receive user operations (gesture operations and tapping operations). For example, if a user brings his or her hand close to the dock speaker 1 in order to operate the dock speaker 1, the power is automatically turned on. Thus, the user may perform volume adjustment, music selection, playback start, etc.

After the system is started up at step S2, at step S3, it is determined whether a user operation (gesture operation or tapping operation) is recognized based on the detection results of the electrostatic switch 13 and the acceleration sensor 14. If it is determined that a user operation is recognized, the method proceeds to step S4. If it is determined that a user operation is not recognized, the method proceeds to step S5.

If it is determined that a user operation is recognized at step S3, various types of operations (volume-up/down operations, playback track feed/return operations, music playback start/pause/stop operations, etc.) are performed at step S4 in response to the user operation recognized by the microcomputer 11. Thereafter, the method returns back to step S3 where standby processing of a user operation is continuously performed.

If it is determined that a user operation is not recognized at step S3, it is determined whether a predetermined sleep transition condition is satisfied at step S5. If it is determined that the predetermined sleep transition condition is not satisfied, the method returns back to step S3 where standby processing of a user operation is continuously performed. On the other hand, if it is determined that the predetermined sleep transition condition is satisfied, the method proceeds to step S6.

When the user proximity is not detected by the proximity sensor 12, user operations are not detected by the electrostatic switch 13 and the acceleration sensor 14, and the respective parts of the system are not operated in response to user operations, over a predetermined sleep transition time, the microcomputer 11 determines that the sleep transition condition is satisfied and determines that the predetermined sleep transition condition is satisfied at step S5.

If it is determined that the predetermined sleep transition condition is satisfied at step S5, the power supply to the respective parts of the system is stopped in response to an instruction from the microcomputer 11, and the overall system enters into a sleep state at step S6. Thereafter, the method returns to step S1 where the user proximity detection is periodically performed.

According to these operations, when the user is not around the dock speaker 1 and the playback of music is not performed, the system automatically enters into the sleep state. This makes it possible to dramatically reduce power consumption. In addition, even when music is being played back prior to the overall system entering into the sleep state, if user's operations are not received for a predefined period, only the user interface device 10 may be entered into a sleep state while the music playback operation is continuously performed.

FIGS. 4A to 4D illustrate exemplary user operations performed using the electrostatic switch 13, according to embodiments of the present disclosure. As illustrated in FIGS. 4A to 4D, the microcomputer 11 is capable of recognizing gesture operations and tapping operations based on the detection result of the electrostatic switch 13.

For example, a vertical slide operation and a horizontal slide operation is illustrated in FIG. 4A. These slide operations may be used in performing volume-up/down operations or the like. Descriptions will be made with reference to FIG. 2. If changes in capacitance are detected in the order of electrodes E, F, G, and H, it means that a fingertip is moved from the electrode E toward the electrode H. Thus, the microcomputer 11 may recognize a rightward slide operation and turn the volume up. On the other hand, if changes in capacitance are detected in the order of electrodes H, G, F, and E, it means that a fingertip is moved from the electrode H toward the electrode E. Thus, the microcomputer 11 may recognize a leftward slide operation and turn the volume down.

Figure 4B:
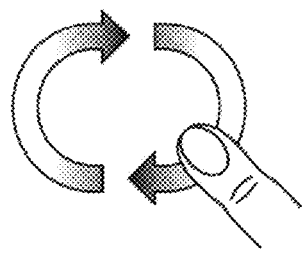

A wheel operation is illustrated in FIG. 4B. The wheel operation may be used in performing playback track feed/return operations or the like. Descriptions will be made with reference to FIG. 2. If changes in capacitance are detected in the order of electrodes A, B, C, D, and A, it means that a fingertip is moved in a rightward (clockwise) direction over the electrodes A to D. Thus, the microcomputer 11 may recognize a rightward wheel operation and perform a playback track feed process. On the other hand, if changes in capacitance are detected in the order of electrodes D, C, B, A, and D, it means that a fingertip is moved in a leftward (counterclockwise) direction over the electrodes A to D. Thus, the microcomputer 11 may recognize a leftward wheel operation and perform a playback track return process.

During the slide operations and the wheel operations described above, it is possible to determine the movement speed of the fingertip from the time between the detection of a capacitance change in one electrode and the detection of a capacitance change in another adjoining electrode. If the current volume significantly deviates from a desired value, a user tends to move his or her fingertip at a high speed in order to quickly adjust the volume to the desired value. On the other hand, if the current volume is close to a desired value, the user tends to move his or her fingertip at a low speed in order to accurately adjust the volume to the desired value. This also applies to the playback track feed/return operations. In order to reflect the user's needs mentioned above, the volume adjustment or the music selection may be performed with a rougher tone when the movement speed of the fingertip is high. Conversely, the volume adjustment or the music selection may be performed with a finer tone when the movement speed of the fingertip is low.

Figure 4C:
Figure 4D:
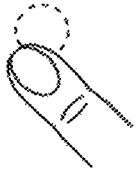

Furthermore, the electrostatic switch 13 is capable of receiving not only the slide operations but also double tapping operations and single tapping operations (or long-press operations) as illustrated in FIG. 4C and FIG. 4D. For example, by independently tapping or long-pressing each of the electrodes A to H, it is possible to perform music playback start/pause/stop operations or the like.

Figure 5:
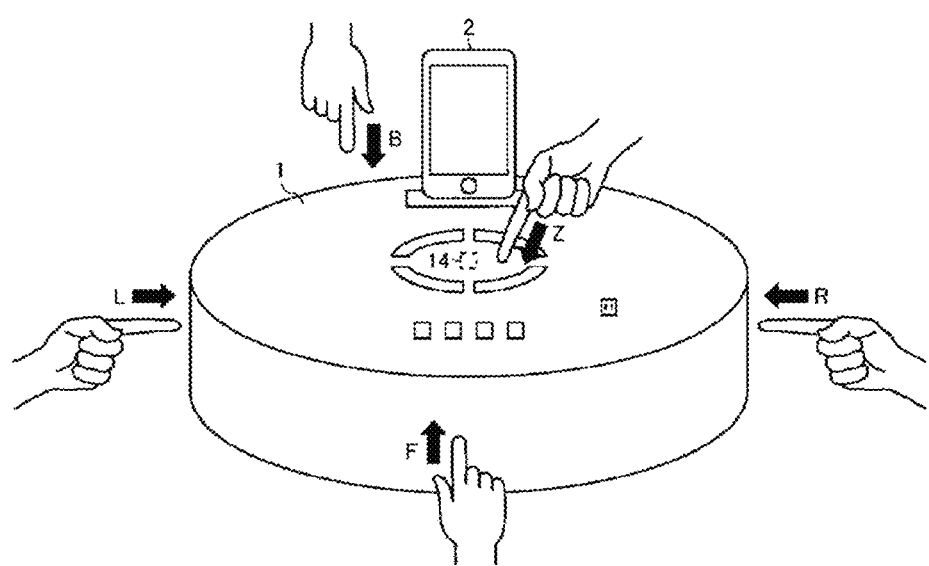
FIG. 5 illustrates examples of user operations performed using an acceleration sensor, according to one embodiment of the present disclosure.

FIG. 5 illustrates examples of user operations performed using the acceleration sensor 14, according to one embodiment of the present disclosure. As illustrated, the microcomputer 11 may recognize tapping operations based on the detection result of the acceleration sensor 14. For example, the microcomputer 11 performs music playback start/pause/stop operations when tapping operations with respect to the top plate of the housing (arrow Z) are detected. In addition, the microcomputer 11 performs a playback track feed process when a tapping operation with respect to the left side plate of the housing (arrow L) is detected, and performs a playback track return process when a tapping operation with respect to the right side plate of the housing (arrow R) is detected. Moreover, the microcomputer 11 performs a volume-up process when a tapping operation with respect to the front side plate of the housing (arrow F) is detected, and performs a volume-down process when a tapping operation with respect to the back side plate of the housing (arrow B) is detected. In respect of the respective tapping operations, different processes may be performed depending on whether each of the tapping operations is a single tapping operation or a double tapping operation.

By receiving the tapping operations with respect to the top plate and the side plate of the housing, the user may operate the dock speaker 1 more intuitively compared to the gesture operations detected by the electrostatic switch 13, which may shorten the operation time. In addition, it is possible to significantly improve the usability even for users (aged person or handicapped user) having difficulties in performing gesture operations.

Figure 6:
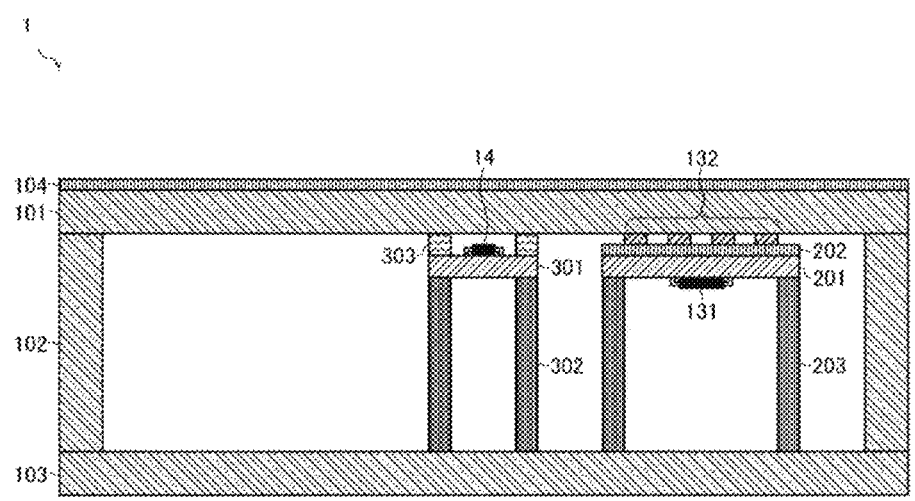
FIG. 6 illustrates a vertical sectional view showing the internal structure of the dock speaker, according to one embodiment of the present disclosure.

FIG. 6 is vertical sectional view schematically illustrating the internal structure of the dock speaker 1 according to one embodiment of the present disclosure. The housing of the dock speaker 1 is formed by a top plate 101, a side plate 102 and a bottom plate 103 (all of which are made of acrylic resin). A design film 104 for decorating the top plate 101 and indicating a slide operation region and a wheel operation region is affixed to the front surface (the upper surface) of the top plate 101.

The plurality of electrodes 132 that constitute the electrostatic switch 13 are affixed to the rear surface (the lower surface) of the top plate 101 in a state in which the electrodes 132 are mounted on a flexible substrate 202. With this configuration, irregularities are not generated on the front surface (the upper surface) of the top plate 101. This makes it possible to enhance the design of the dock speaker 1. In order to improve the detection accuracy of the electrostatic switch 13, it is preferable in some embodiments to make the top plate 101 as thin as possible within an extent that does not cause problems in the strength of the housing.

The electrostatic switch control IC 131 that constitutes the electrostatic switch 13 is mounted at the lower surface side (the side facing the bottom plate 103) of a printed wiring substrate 201. A flexible substrate 202 mounting the plurality of electrodes 132 is provided at the upper surface side (the side facing the top plate 101) of the printed wiring substrate 201. The electrostatic switch control IC 131 and the electrodes 132 are connected to each other via the printed wiring substrate 201 and the flexible substrate 202. The printed wiring substrate 201 is supported on the bottom plate 103 through a support member 203.

The acceleration sensor 14 is mounted on the upper surface side (the side facing the top plate 101) of a printed wiring substrate 301. The printed wiring substrate 301 is supported on the bottom plate 103 through a support member 302. A connection member 303 which interconnects the top plate 101 and the printed wiring substrate 301 is provided between the top plate 101 and the printed wiring substrate 301. For example, double-sided tape having a thickness substantially equal to the thickness of the acceleration sensor 14 may be used as the connection member 303. With this configuration, the impact applied to the top plate 101 or the side plate 102 of the housing may be easily transmitted to the acceleration sensor 14 via the connection member 303 and the printed wiring substrate 301. This makes it possible to increase the sensitivity of detection of a tapping operation.

Application to Headphone

Figure 7:
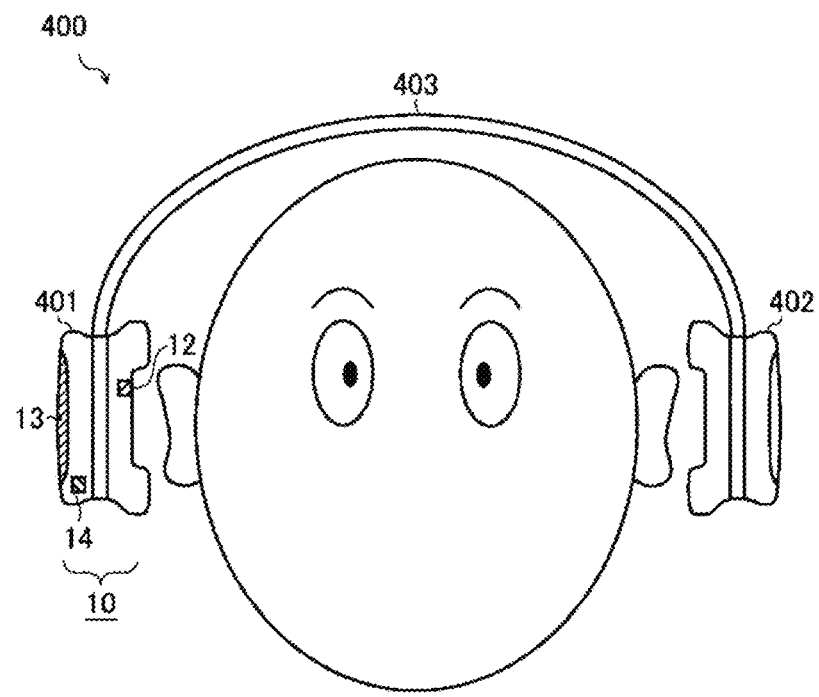
FIG. 7 illustrates an exemplary configuration a headphone including a user interface device, according to one embodiment of the present disclosure.

FIG. 7 is a front view schematically illustrating an exemplary configuration of a headphone 400 including the user interface device 10. The headphone 400 of this exemplary configuration includes a right speaker 401, a left speaker 402, and a headband 403.

In view of the fact that most of the users are right-handed, the user interface device 10 is collectively installed on the right speaker 401, which is easily operable with the user's right hand. However, the arrangement position of the user interface device 10 is not limited thereto. The user interface device 10 may be collectively installed on the left speaker 402. Alternatively, the user interface device 10 may be divisionally installed on the right speaker 401 and the left speaker 402 (and the headband 403).

The proximity sensor 12 is installed on the inner surface of an ear pad and is configured to detect whether a user is wearing the headphone 400 (or whether the ear or the temporal region of a user is proximate to the proximity sensor 12). With this configuration, it is possible to implement a power-saving function that turns the power on when a user wears the headphone 400 and turns the power off after a predetermined time the user takes off the headphone 400.

The electrostatic switch 13 is installed on the outer surface of the housing and is configured to detect a user's gesture operation. With this configuration, it is possible to receive user's complex operations (volume adjustment, music selection, etc.).

The acceleration sensor 14 is installed within the housing and is configured to detect a user's tapping operation. With this configuration, it is possible to more intuitively operate the headphone 400 as compared to the gesture operation detected by the electrostatic switch 13.

The playback method of the headphone 400 (stereo/monaural), the drive method of the headphone 400 (dynamic type/magnetic type/balanced armature type/hybrid type/piezoelectric type/crystal type/electrostatic type), the structure of the headphone 400 (open type/closed type), and the shape of the headphone 400 (inner ear type/canal type/headband type/neckband type/ear-hook type/clip type) do not matter as long as it is possible to secure a mounting space for the user interface device 10 (the microcomputer 11, the proximity sensor 12, the electrostatic switch 13, and the acceleration sensor 14).

Figure 8:
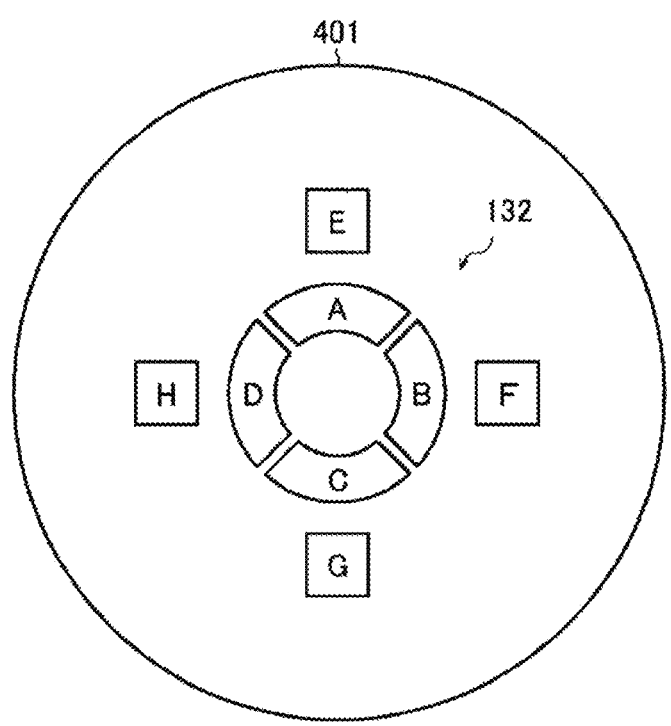
FIG. 8 illustrates a layout diagram of an exemplary arrangement of electrodes according to one embodiment of the present disclosure.

FIG. 8 illustrates a layout diagram of an exemplary arrangement of the electrodes 132 according to one embodiment of the present disclosure. The electrodes A to D are annularly disposed in the central portion of the housing so that the electrodes A to D may detect leftward/rightward wheel operations. Furthermore, the electrodes E to H are regularly disposed at the outer side of the electrodes A to D in order to detect a vertical (up-down-direction) slide operation and a horizontal (left-right-direction) slide operation.

More specifically, the electrodes E, A, C, and G are linearly disposed so as to make one line in the vertical direction (the up-down direction). Furthermore, the electrodes H, D, B, and F are linearly disposed so as to make one line in the horizontal direction (the left-right direction). That is, the electrodes A to D are used in detecting not only wheel operations but also slide operations.

Since all the electrodes A to H are installed in the housing of the right speaker 401, a user wearing the headphone 400 may perform wheel operations or slide operations in a fumbling state without looking at the electrodes A to H. Taking this into account, it is preferable in some embodiments to loosely set the determination criteria of the slide operations or the wheel operations.

For example, vertical (down-direction) slide operations may be recognized not only when capacitance changes are detected in the order of the electrodes E, A, C, and G but also when capacitance changes are detected in the order of the electrodes E, A, and C, the order of the electrodes A, C, and G, the order of the electrodes E, A, and B, the order of the electrodes E, A, and D, the order of the electrodes B, C, and G, or the order of the electrodes D, C, and G. This may be similarly applied to up-direction slide operations.

Furthermore, horizontal (right-direction) slide operations may be recognized not only when capacitance changes are detected in the order of the electrodes H, D, B, and F but also when capacitance changes are detected in the order of the electrodes H, D, and B, the order of the electrodes D, B, and F, the order of the electrodes H, D, and A, the order of the electrodes H, D, and C, the order of the electrodes A, B, and F, or the order of the electrodes C, B, and F. This may be similarly applied to left-direction slide operations.

In addition, the rightward (clockwise) wheel operation may be recognized, in some embodiments, not only when capacitance changes are detected in the order of the electrodes A, B, C, and D but also when capacitance changes are detected in, e.g., the order of the electrodes A, B, G, and H or the order of electrodes E, F, C, and D. This may be similarly applied to leftward (counterclockwise) wheel operations.

Advantageous Effects

In a user interface device, it is possible to use a wide variety of sensors including sensors suitable for simple operations and sensors suitable for complex operations. In a user interface device which employs a single sensor, there may be a case where it is impossible to flexibly cope with the in-use situation, the user's handicap, etc. However, if a plurality of sensors is mounted, power consumption unnecessarily increases.

On the other hand, the user interface device 10 described thus far uses a proximity sensor, an electrostatic switch, and an acceleration sensor in combination. Thus, the user interface device is inexpensive and power-saving, and is capable of receiving various user operations.

Other Modifications

Various technical features disclosed herein may be modified in many different forms without departing from the spirit of the present disclosure. For example, the mounting target of the user interface device is not limited to the dock speaker or the headphone. The user interface device may be widely applied to general electronic devices which are required to receive user operations.

That is, it is to be understood that the above-described embodiment is exemplary and not limitative in all respects. The technical scope of the present disclosure is not defined by the above descriptions of the embodiment but is defined by the claims. It is to be appreciated that all modifications equivalent in meaning and scope to the claims are included in the technical scope of the present disclosure.

INDUSTRIAL APPLICABILITY

The present disclosure is applicable to a user interface device mounted to, for example, a dock speaker or a headphone.

The user interface device disclosed herein is inexpensive and power-saving, and is capable of accepting various user operations.

While certain embodiments have been described, these embodiments have been presented by way of example only, and are not intended to limit the scope of the disclosure. Indeed, the methods and apparatuses described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A user interface device, comprising:
a proximity sensor configured to detect proximity of a user;
an electrostatic switch configured to detect capacitance changes of a plurality of electrodes;
an acceleration sensor configured to detect an acceleration; and
a microcomputer configured to control supply of electric current to the electrostatic switch and the acceleration sensor based on a detection result of the proximity sensor, and recognize a plurality of user operations based on detection results of the electrostatic switch and the acceleration sensor,
wherein the microcomputer is further configured to control a power supply state of the electrostatic switch and the acceleration sensor such that the power supply state is changed from a power-off state to a power-on state when the proximity sensor detects the proximity of the user.

2. The user interface device of claim 1, wherein the proximity sensor is configured to detect the proximity of the user based on whether infrared light outputted from a light emitting unit is reflected by an object and returned to a light receiving unit.

3. The user interface device of claim 1, wherein the proximity sensor is configured to detect the proximity of the user based on whether a sharp change in light receiving intensity of a light receiving unit is generated.

4. The user interface device of claim 1, wherein the microcomputer is configured to recognize a gesture operation and a tapping operation based on the detection result of the electrostatic switch.

5. The user interface device of claim 4, wherein the electrodes are arranged in a layout corresponding to the gesture operation to be recognized by the microcomputer.

6. The user interface device of claim 1, wherein the microcomputer is configured to recognize a tapping operation based on the detection result of the acceleration sensor.

7. An electronic device comprising the user interface device of claim 1.

8. The electronic device of claim 7, wherein the microcomputer is configured to stop power supply to respective parts of a system when a predetermined sleep transition condition is satisfied, and to resume the power supply to the respective parts of the system when the proximity of the user is detected.

9. The electronic device of claim 8, wherein the microcomputer is configured to determine that the predetermined sleep transition condition is satisfied, when proximity of the user is not detected, a user operation is not detected by the electrostatic switch and the acceleration sensor, and the respective parts of the system are not operated in response to the user operation, over a predetermined sleep transition time.

10. The electronic device of claim 7, further comprising:
a connection member configured to interconnect a housing of the electronic device and a substrate on which the acceleration sensor is mounted.

\* \* \* \* \*